United States Patent

Swearingen

[11] 3,935,102
[45] Jan. 27, 1976

[54] GEOTHERMAL POWER SYSTEM AND METHOD

[76] Inventor: Judson S. Swearingen, 500 Bell Air Road, Los Angeles, Calif. 90024

[22] Filed: Dec. 13, 1973

[21] Appl. No.: 424,470

[52] U.S. Cl. .................. 210/83; 60/641; 165/4; 165/45; 165/119; 210/170; 210/181
[51] Int. Cl.² .................. F03G 7/02; B01D 21/00
[58] Field of Search .......... 60/641; 165/1, 45, 4, 7, 165/119; 210/170, 181, 83

[56] References Cited
UNITED STATES PATENTS

| | | | |
|---|---|---|---|
| 2,580,635 | 1/1952 | Winter, Jr. | 165/1 X |
| 2,973,623 | 3/1961 | Nettel | 165/4 X |
| 2,995,208 | 8/1961 | Hachmuth et al. | 165/4 X |
| 3,519,064 | 7/1970 | Cooper | 165/1 |
| 3,676,078 | 7/1972 | Jacoby | 165/45 X |
| 3,751,673 | 8/1973 | Sprankle | 60/641 X |
| 3,757,516 | 9/1973 | McCabe | 165/45 X |
| 3,795,487 | 3/1974 | Tamalet | 165/1 X |

Primary Examiner—Charles N. Hart
Assistant Examiner—Robert H. Spitzer
Attorney, Agent, or Firm—Browning & Bushman

[57] ABSTRACT

A system and method for extracting heat from hot unrefined water and ultimately using this heat to do useful work, while avoiding the danger of damage to heat exchange equipment by scale and corrosion, which is many times attendant on such methods. The hot unrefined water is passed through a housing containing porous material giving up its heat to the porous material. A volume of clean water is then passed through the housing picking up the heat from the porous material. The heated clean water can then be passed through a more or less conventional heat exchanger without danger of damaging the internal surfaces of the exchanger with scale and corrosion.

9 Claims, 3 Drawing Figures

3,935,102

GEOTHERMAL POWER SYSTEM AND METHOD

BACKGROUND OF THE INVENTION

1. Field of the Invention

In accord with today's need for more and better sources of energy, and sources which create minimum pollution problems, increased attention is being given to geothermal sources of energy. These include capturing and utilizing the heat from naturally hot underground water to do useful work. After absorption of its heat, the water can be returned to the ground and there are usually little or no polluting by-products from such systems.

2. Description of the Prior Art

In some such systems the hot water is passed through a heat exchanger to heat a working fluid and ultimately produce useful work.

One problem with such a system is that the water which is drawn from the ground, and which may in some cases be primarily brine, is unrefined and contains many impurities both in solution and in suspension. In fact, the hot water is often supersaturated with impurities such as silica, calcium sulfate, silicates and other compounds which can cause rapid corrosion, scaling, etc., of the surfaces of a heat exchanger if the unrefined water is passed directly through the heat exchanger. Such water may be purified or refined before passing it through the heat exchanger, as by filtering, however, this requires that the water, filtering systems, etc., be well insulated and/or pressurized so that minimum heat is lost during the refining process. Additionally the purification of the water is costly.

SUMMARY OF THE INVENTION

In accord with the present invention, the unrefined hot water is prevented from coming into direct contact with the surfaces of the heat exchanger. Filters and like equipment are not needed. A heat transfer medium in the form of a housing containing porous material such as a bed of gravel or other granular material is used to transfer heat from the unrefined water to clean water which is then passed through the heat exchanger. The porous material is inexpensive and expendable and can even be easily cleaned and reused if desired.

In the system of the invention a volume of the hot unrefined water is passed through a housing containing porous material which picks up the heat of the water. A volume of clean water is then passed through the housing to pick up the heat from the porous material. The now heated clean water can then be passed through a heat exchanger without significant danger to the surfaces of the exchanger. The clean water can be recycled through the system many times, each time passing through the housing immediately after a volume of the unrefined water.

Thus a major object of the invention is to provide a system and method of extracting heat from hot unrefined water and transferring said heat to a working fluid in a heat exchanger without direct contact of the unrefined water with the exchanger.

Another object of the invention is to provide a system and method as described above in which an inexpensive and expendable and/or readily reconditionable heat transfer medium is employed.

Another important aspect of the invention is that the source of the clean water may be the unrefined water which has been passed through the porous material. After being removed from the housing, the cooled unrefined water is delivered to a detention receptable. Here it attains stabilization through elimination of its supersaturation and many of the impurities precipitate to the bottom of the receptacle. The liquid which is left on the top of the receptacle is substantially free of impurities to the extent that what impurities are left in the liquid are not sufficient to unduly damage the surfaces of the heat exchanger. It is this substantially impurity-free liquid which is used as the clean water, yet no filtering, etc., is necessary.

Thus, another object of the invention is the provision of a system and method of extracting heat from unrefined water and transferring it to clean water, wherein said clean water is derived from said unrefined water without the use of filters or other elaborate equipment.

It will be understood that the substantially impurity-free liquid in the detention receptacle does contain some particles in suspension of the same nature as the impurities in the unrefined water. These are useful in continuously cleaning the system. For example, some impurities will be left in the porous material when the unrefined water passes therethrough and will then be picked up by the clean water which subsequently passes through the porous material. Other impurities will be introduced into the purified water in the housing, for example by mixing of water in the trailing edge of a volume of unrefined water with the immediately following leading edge of a volume of clean water. Still other impurities are introduced by erosion of the porous material. Any such impurities which are thus picked up by the clean water will tend to adhere to the particles already suspended in the clean water, which offer a large amount of closely associated surface area, rather than adhering to the material in the housing or to the surfaces of the heat exchanger. The impurities will thus be carried along with the clean water away from the apparatus. It is also desirable that these suspended particles have the same electrical charge as any boiler scale which may have formed on the surfaces of the heat exchanger so that the boiler scale will not have any greater attraction for the impurities than the suspended particles. As the impurity content of the clean water increases, this water can be freshened by continuously or periodically tapping quantities of the water from communication with the heat exchanger and replacing them with quantities of the liquid from the detention receptacle.

Thus, another object of the invention is to provide a system and method as described above in which the clean water contains particles in suspension which are instrumental in cleansing of the system.

A preferred embodiment of the invention provides for continuous operation of the system by the use of two housings containing porous material. The source of hot unrefined water is connected to the entrance end of one of the housings and hot unrefined water is passed through this housing until the leading edge of this volume of water is at the exit end of the housing. At this time, the source of hot unrefined water is disconnected from the first housing and connected to the entrance end of the second housing; simultaneously the source of cool clean water is connected to the entrance end of the first housing (having been previously connected to the second). At the same time that the source of clean water is connected to the first housing, i.e. when the leading edge of the preceding volume of unrefined water has reached the exit end of the first housing, the exit end of the first housing is connected to the detention receptacle so that the unrefined water may be deposited therein. Meanwhile, the leading edge of a volume of clean water, which water has been heated, has reached the exit end of the second housing which is then connected to the heat exchanger. Thus, the entrance ends of the housings are alternately connected to the sources of unrefined and clean water and each time the connections at the entrance ends are switched, the connections at the exit ends are also switched to alternately direct unrefined and clean water from the housings to the detention receptacle and the heat exchanger respectively. To allow for proper timing in this simultaneous switching of the connections of the entrance and exit ends of the beds, a temperature front, on one side of which the porous material and water are at their highest temperature and on the other side of which the porous material and water are at their lowest temperature, must move along the porous material with half the velocity of the water volume such that it is at the center of the housing when the leading edge of a volume of water has reached the exit end. One way of achieving this is to choose the porous material such that its heat capacity per unit volume is substantially the same as that of the unrefined water or clean water contained in the voids of a unit volume of the gravel or other porous material.

Still another object of the invention is to provide a two housing system wherein the relative velocities of the temperature fronts and the leading edges of the volumes of water in the two housings are such that the entrance and exit connections may be switched simultaneously with maximum efficiency in the use of the available heat.

Thus, still another object of the invention is to provide a system and method as described above wherein the porous material, the unrefined water in the voids of the porous material, and the clean water in the voids of the porous material all have substantially the same heat capacity per unti volume of porous material.

Other objects, features, and advantages of the present invention will be made apparent by the drawings and by the detailed description and claims to follow.

DESCRIPTION OF THE PREFERRED EMBODIMENT

Figure 1:
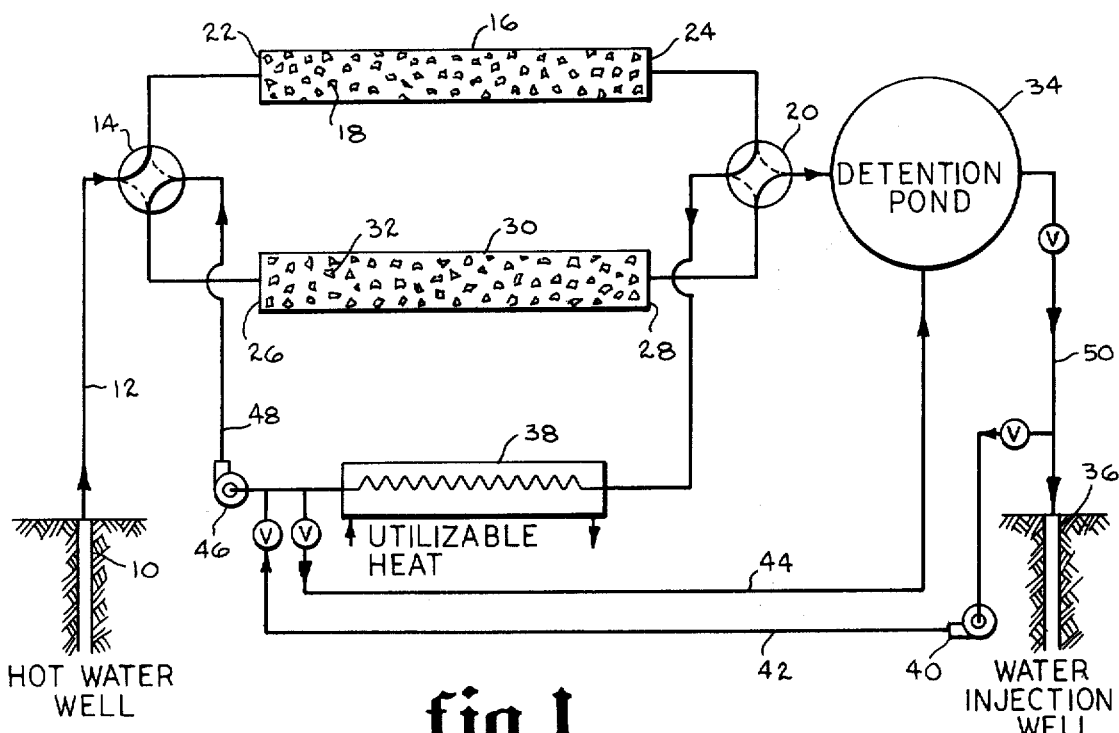
FIG. 1 is a flow diagram of the system of the invention.

Referring now to FIG. 1, hot underground water is drawn up from a well 10. This water, which may be brine, contains many impurities both in solution and in suspension. These may include silica, calcium sulfate, silicates, and possibly other compounds. Many of these impurities tend to form precipitates and may also tend to form scale. This is especially true upon cooling of the water. Any water containing sufficient impurities to cause excessive damage to or interference with the operation of the heat exchanger and, in particular, water essentially as it comes from the well, will be referred to herein as "unrefined" water.

The hot unrefined water is delivered via line 12 to a four way valve 14. When valve 14 is in the position shown in solid lines, the hot water is delivered to the entrance end 22 of a container 16 containing a porous bed 18. The word "porous," as used herein, is intended to refer to the bed of material as a whole in the sense that water can flow through the bed via the voids or "pores" between the individual granules. Thus for example a gravel made up of primarily siliceous materials, for one, can be used. In other words, the term porous is used primarily in a macroscopic sense in that it is preferable that the particles which make up the aggregate are themselves substantially nonporous. Thus, for example, material such as molecular sieves might be used but would not be preferable because of their inherent microporosity. It will be understood however that other forms of porous material might be used. For example the housing could contain a single porous brick of appropriate material.

The gravel bed 18 absorbs the heat of the unrefined water as it flows through the housing 16. Meanwhile a volume of cool clean water or other suitable liquid, the nature and source of which will be described more fully below, is pumped from a heat exchanger 38 by pump 46 into the entrance end 26 of a second housing 30 via line 48 and four way valve 14. The housings 16 and 30 are preferably of the same size and housing 30 contains gravel bed 32. It will be understood that the gravel 32 in housing 30 at this point in the cycle is hot, a volume of hot unrefined water having previously been passed therethrough. Thus, the clean water absorbs heat from gravel 32 as it passes through housing 30.

The volumes of unrefined and clean water are admitted to the respective entrance ends 22 and 26 of the housings 16 and 30 at approximately the same time. These volumes of water have substantially the same flow characteristics so that they flow through their gravel beds at substantially the same speed. Each of these volumes of water may be considered to have a leading edge, i.e. the portion of the volume of water which has passed farthest toward the exit end 24 or 28 of its respective housing. The leading edges of the two volumes reach the exit ends 24 and 28 at approximately the same time, and the portions of the respective volumes of water which are then at the entrance ends 22 and 26 may be considered the trailing edges of their respective volumes of water.

At this time valve 14 is switched to the position shown in dotted lines so that a new volume of unrefined water begins to flow into the now cool bed 32 and a new volume of clean water begins to flow into the heated bed 18. Simultaneously, a second four way valve 20 connected to the exit ends 24 and 28 of the beds is turned to the position shown in dotted lines so that the cool unrefined water now exiting from housing 16 is delivered to a detention receptacle such as a pond 34 and the clean water which has been heated in bed 32 is delivered to a heat exchanger 38 or to a boiler or the like which may be more or less conventional. Here it gives up the heat indirectly absorbed from the unrefined water through the gravel bed 32 to a working fluid which ultimately results in the production of useful work.

It will be appreciated that each of the beds 18 and 32 has volumes of unrefined water and clean water alternately passed therethrough in a continuous cycle, the unrefined water giving up heat to the gravel and the gravel giving up heat to the clean water. It will also be appreciated that while unrefined water is passing through one bed, clean water is passing through the other so that the total process of heat transfer in exchanger 38 is continuous. By proper switching of valve 20 the unrefined water exiting from one bed is directed into the detention pond 34 while the clean water is entering that bed and clean water exiting from the other bed is directed to the heat exchanger 38 while unrefined water is entering said other bed. The solid line position of valve 20 directs water from housing 16 to the heat exchanger 38 and water from housing 30 to the pond 34; the dotted line position directs water from housing 16 to the pond and water from housing 30 to the heat exchanger.

One of the primary advantages of the system of the invention is that the clean water may be derived from the unrefined water without the need for filters or other expensive or elaborate equipment. However, it will be appreciated that the clean water could be derived from other sources and also that, while water is preferred, other liquids might sometimes be used. It should be understood that the terms "clean water" or "clean liquid" are intended to include any water or liquid which is sufficiently free of impurities that it can be safely and practically passed through heat exchange equipment, etc. In the preferred form of the invention, the unrefined water which enters the pond 34 from the housings 16 and 30 has been cooled by giving up its heat to the gravel in the beds. It is then in condition to attain stabilization by elimination of its supersaturation. As it rests in the pond 34, many of the impurities precipitate to the bottom of the pond leaving on the top of the pond a liquid which is substantially free of impurities. By "substantially free of impurities" is meant that the liquid is sufficiently free of impurities that it can be safely passed through a heat exchanger or other apparatus in direct contact with the surfaces of the apparatus without excessive danger of scaling, corrosion, etc. It is part of this substantially impurity-free liquid that is used as at least part of the "clean water" while the remainder of the impurity free liquid may be returned to the ground via line 50 and well 36. It will be understood that part of the clean water may come from another source, however, the substantially impurity-free liquid in the pond may, and preferably does, supply all the clean water.

It should be understood that this liquid from the pond does contain some impurities in the form of particles in suspension. However, these particles, rather than creating a problem, are instrumental in cleansing the apparatus of the system.

Some impurities are left in the beds 18 and 32 by the unrefined water as it passes therethrough. It is desirable that the beds be kept as free as possible of these impurities. The impurities thus left in the gravel beds are picked up by the clean water as it passes through the beds. Other impurities resulting from erosion of the gravel are also picked up by the clean water. Furthermore, impurities are picked up by the clean water due to intermingling of unrefined and clean water at the adjacent leading and trailing edges of such volumes of water which pass through the beds. These impurities may tend to precipitate or produce a scaling effect particularly in the heat exchanger where the water carrying them undergoes a temperature change. However, the particles already in suspension in the clean water, i.e. as it is taken from the pond, are of the same character as the impurities which will be picked up by the clean water as it passes through the system as described. Thus, the impurities will tend to adhere to the particles in suspension in the clean water, which provide a large amount of intimately located surface area for reception of these impurities, rather than to the equipment. The impurities are thus carried along with the clean water and removed from the beds, the heat exchanger, and other equipment.

It should be noted that in most practical cases, at least some boiler scale is going to form on the surfaces of the heat exchanger. This scale may have an electrical charge. The particles in suspension (or colloidal dispersion) in the clean water may have a charge of the same sign as the boiler scale, or they can be made to have one of the same sign by use of a suitable additive to the clean water. Thus, the particles which may be present as colloidal dispersion will be repelled by the boiler scale. Since the colloidal dispersion offers such a great surface area in intimate association with the dissolved impurities in the water, these impurities will tend to largely collect on the suspended particles rather than on the boiler scale thus forming more scale.

As the content of impurities in the clean water increases by virtue of impurities adhering to the suspended particles, the clean water may be freshened by continuously or periodically tapping off quantities of the clean water from communication with the heat exchanger 38 and other parts of the system via line 44 and returning it to the pond 34 for restabilization. These quantities of the clean water are replaced by quantities of substantially impurity-free liquid from the pond 34. These quantities of liquid may be pumped from return line 50 by pump 40 and directed into communication with the heat exchanger and other parts of the system via line 42.

It should also be understood that the gravel in the beds 18 and 32 is usually inexpensive and expendable. However, when it becomes fouled with impurities, it can be reconditioned and reused if desired. For example, it can be cleaned by tumbling and washing. Additionally the erosion of the gravel and removal of eroded granules by the clean water as described above is instrumental in keeping the gravel beds clean.

As explained above, each volume of water, either unrefined or clean, which passes through one of the housings 16 or 30 and its respective contained bed 18 or 32 may be considered to have a leading and a trailing edge. The leading edge of each volume of water will be at the exit end of the bed when the trailing edge is at the entrance end. Thus, the volumes of water might be considered to have a "length" equivalent to that of the beds. It is desirable that the valves 14 and 20 be turned simultaneously so that the two volumes of water exiting from the respective beds are directed into the appropriate receptacles, i.e. pond or heat exchanger, while new volumes of water are directed into the beds, each volume of unrefined water always being followed by a volume of clean water in a particular bed.

Figure 2:
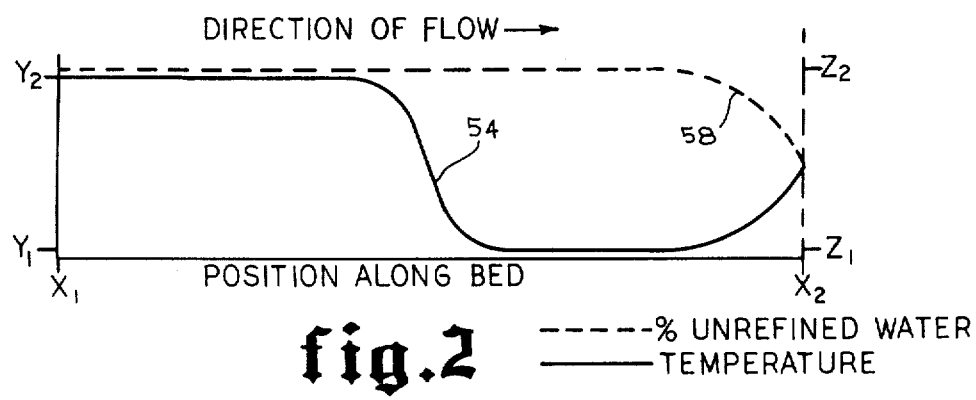
FIG. 2 is a graph showing temperature and water composition versus bed length for a volume of unrefined water.
Figure 3:
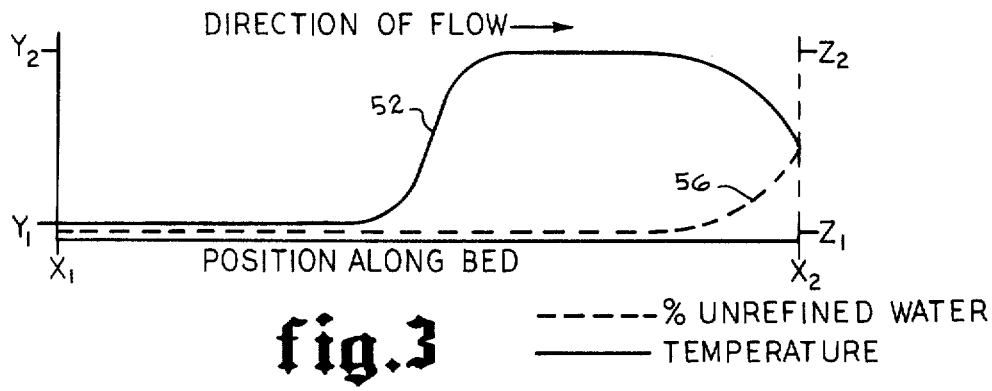
FIG. 3 is a graph showing temperature and water composition versus bed length for a volume of clean water.

It is noted here that as a volume of water moves through one of the beds, a temperature front which extends for only a short distance along the bed moves along the bed also. The portions 54 and 52 of the solid line curves in FIGS. 2 and 3 respectively represent such temperature fronts where, in the solid curves, temperatures of the water-gravel mixtures in respective beds are plotted on the vertical axes versus position along the bed on the horizontal axes. $X_1$ represents the entrance end of the bed, and $X_2$ represents the exit end of the bed. $Y_1$ represents minimum temperature and $Y_2$ represents maximum temperature. The dashed curves in FIGS. 2 and 3 represent the positions of the volumes of water in the beds with the portions 58 and 56 representing the leading edges of respective volumes of water. Percentage of the water which is unrefined water is plotted on the vertical axes, $Z_1$ representing 0% unrefined water and $Z_2$ representing 100% unrefined water.

FIG. 2 represents the passage of a volume of unrefined water through one of the beds. The graph shows that the temperature change across the temperature front 54 is abrupt. To the left of the front 54 the temperature is at its highest; to the right of the front, the temperature is at its lowest. The presence of such an abrupt temperature change, recognizable as a front, is made possible by the large surface area provided by the gravel in the beds. FIG. 2 shows that when the leading edge 58 of a volume of unrefined water is at the exit end of a housing, the temperature front 54 is approximately midway through the housing and bed. It will be understood that the leading edge 58 of the volume of water and the temperature front 54 both started at the entrance end of the housing at the same time.

This relationship is also true in FIG. 3 which represents the passage of a volume of clean water through one of the beds. The leading edge 56 and temperature front 52 started at the entrance end of their housing at the same time. At the time represented by the graph of FIG. 3 the leading edge 56 of the volume of water is at the exit end of the housing when the temperature front 52 is approximately halfway along the length of the bed. It will be understood that the temperature fronts move along the beds with half the velocity of the volumes of water. This condition, i.e. that the temperature fronts have half the average speed of the water, makes possible the simultaneous switching of valves 14 and 20 as described above. This condition, in turn, is made possible by proper relation of the heat capacities per unit volume of the gravel (when dry) and of the unrefined water and the clean water in the voids of a unit volume of gravel. In practice the heat capacities of the unrefined and clean water will be substantially equal. By choosing the gravel or other porous material so that it has approximately the same heat capacity as the water in the voids of a unit volume of the bed the condition depicted in FIGS. 2 and 3 is achieved.

This choice depends primarily on the size of the gravel since the heat capacity of the water in the voids of a unit volume of gravel depends on the size of the voids. Obviously smaller voids can be had by choosing finer and finer gravel. Furthermore, the voids in the bed of relatively coarse gravel can be made smaller and hence the heat capacity varied by mixing a finer grade gravel with the coarse gravel so that the fine gravel particles partially fill the voids between the coarse gravel particles.

It will be appreciated that proper choice of the gravel or other porous material may depend partially on the temperature and composition of the unrefined water, and accordingly a large variety of materials may be used. The materials chosen can be naturally occurring or synthetic, i.e. manufactured.

It will be understood that many modifications of the system and method of the invention will suggest themselves to those skilled in the art, and it is intended that the scope of the invention be defined by the claims which follow.

I claim:

1. A method of extracting heat from hot unrefined water containing impurities comprising the steps of: alternately co-currently flowing volumes of said unrefined water and volumes of clean liquid through a housing containing porous material whereby heat is alternately transferred from said unrefined water to said porous material and from said porous material to said clean liquid, and extracting heat from said clean liquid subsequent to its flow through said housing, wherein a high temperature front moves along the length of said housing as each of said volumes of unrefined water is passed therethrough and wherein the subsequent volume of clean liquid is caused to begin to flow through said housing when said high temperature front is intermediate the ends of said housing.

2. The method of claim 1 comprising the further steps of directing said unrefined water exiting from said housing into a detention receptacle; and holding said unrefined water in said receptacle thereby freeing said unrefined water of a portion of said impurities by precipitation of said portion of impurities; thereby forming a substantially impurity-free liquid at the top of said pond; and using a portion of said substantially impurity-free liquid as at least part of said clean liquid, said clean liquid being clean water.

3. The method of claim 2 wherein said unrefined water is incompletely freed of said impurities whereby said substantially impurity-free liquid contains suspended particles of the same nature as said impurities.

4. The method of claim 3 wherein boiler scale forms in said heat exchanger and including the step of maintaining the sign of the charges on said particles the same as the sign of the charge on the boiler scale.

5. The method of claim 3 comprising the further step of withdrawing a quantity of said clean water from communication with said heat exchanger and replacing it with a quantity of said substantially impurity-free liquid from said receptacle.

6. The method of claim 1 wherein there are two such housings containing porous material and volumes of said hot unrefined water and volumes of said clean liquid are alternately co-currently flowed through each of said two housings, such that when a volume of said hot unrefined water is flowing through one of said housings, a volume of said clean liquid is flowing through the other of said housings, said clean liquid being clean water.

7. The method of claim 6 wherein said housings are of substantially equal size and wherein each of said volumes of water is of a quantity relative to the size of said housings that when a leading edge of one of said volumes has reached an exit end of one of said housings, a trailing edge of said one volume is at an entrance end of said one housing.

8. The method of claim 7 wherein a low temperature front moves along the length of each of said housings as each of said volumes of clean water is passed therethrough and wherein each of said high and low temperature fronts is caused to move at a velocity equal to half the velocity of the respective volume of water.

9. The method of claim 8 wherein the heat capacity per unit volume of said porous material when dry is maintained substantially equal to the heat capacity of the unrefined water in the voids in a unit volume of said porous material.

* * * * *